Nov. 16, 1926. 1,606,768
H. C. McLEAN
ICE CREAM CAN WASHING MACHINE
Filed March 18, 1922 9 Sheets-Sheet 1
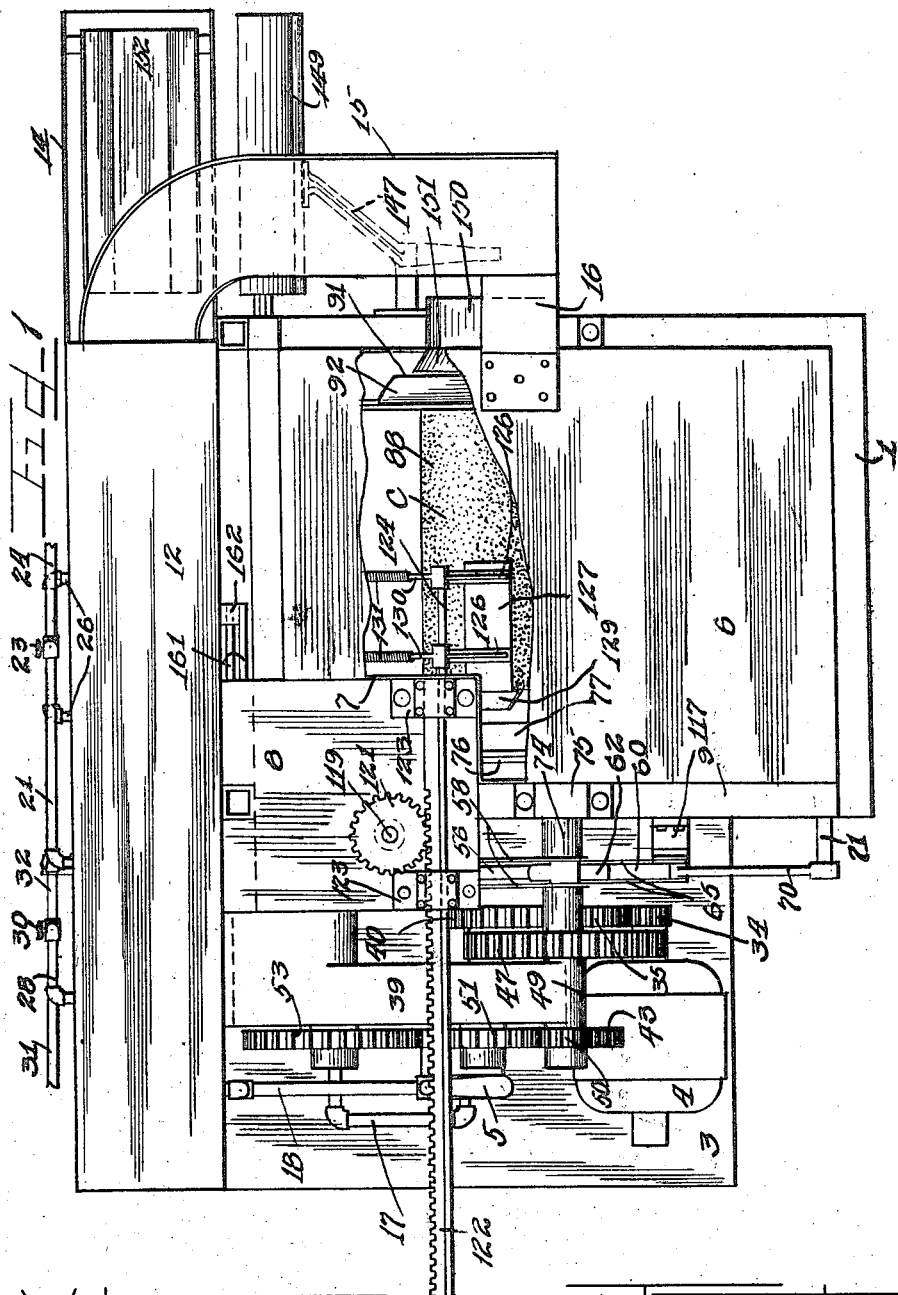

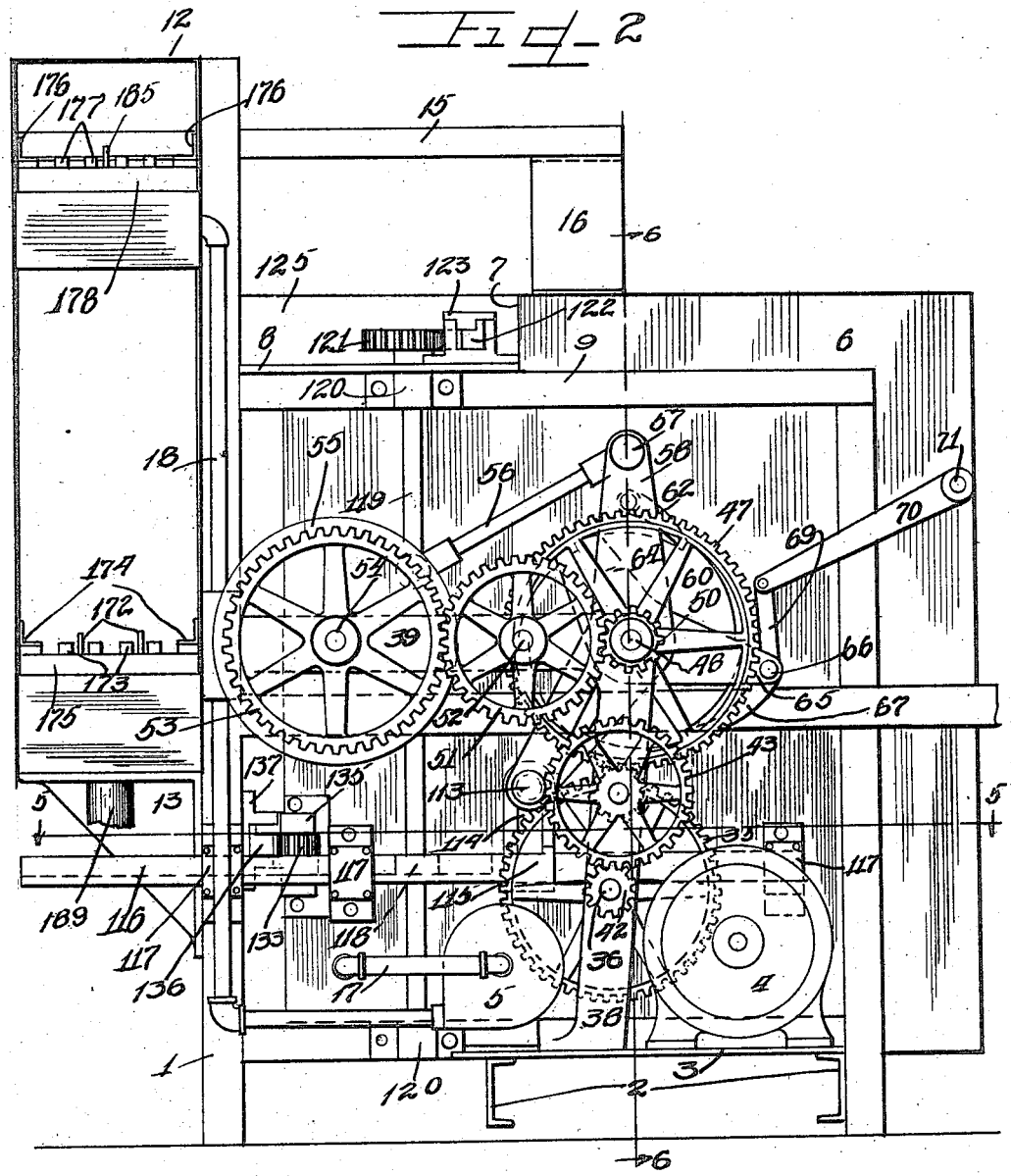

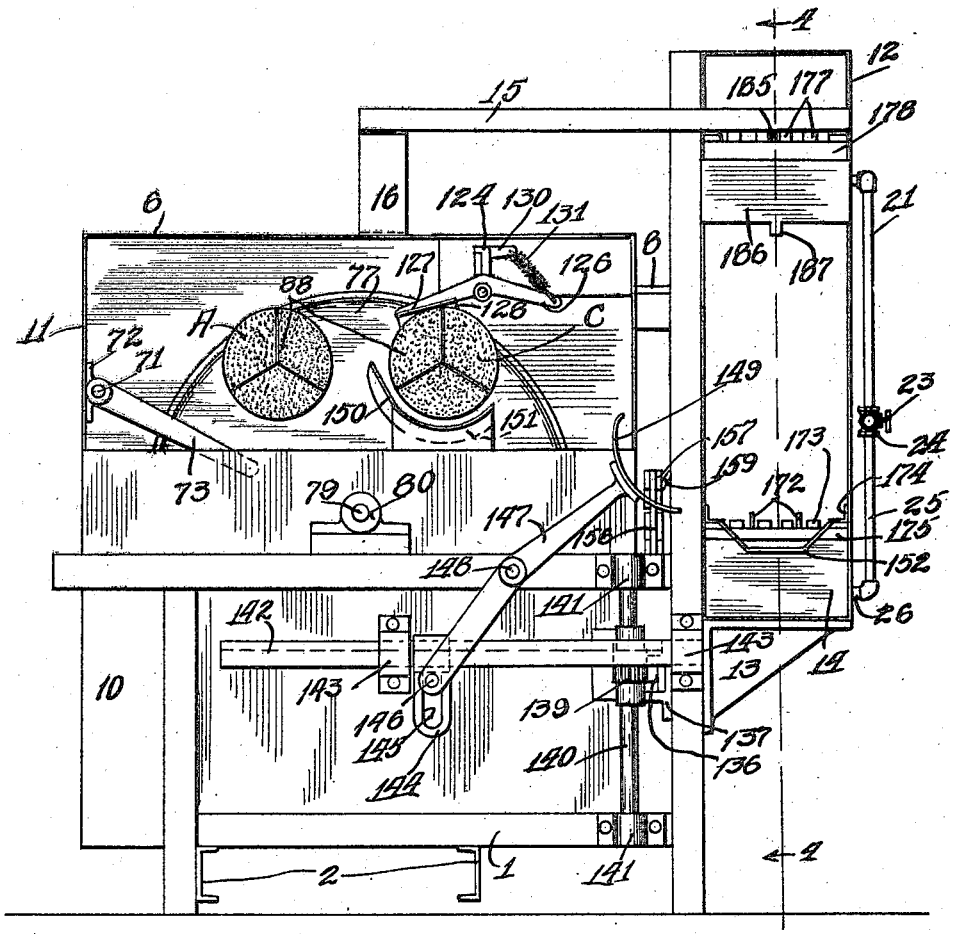

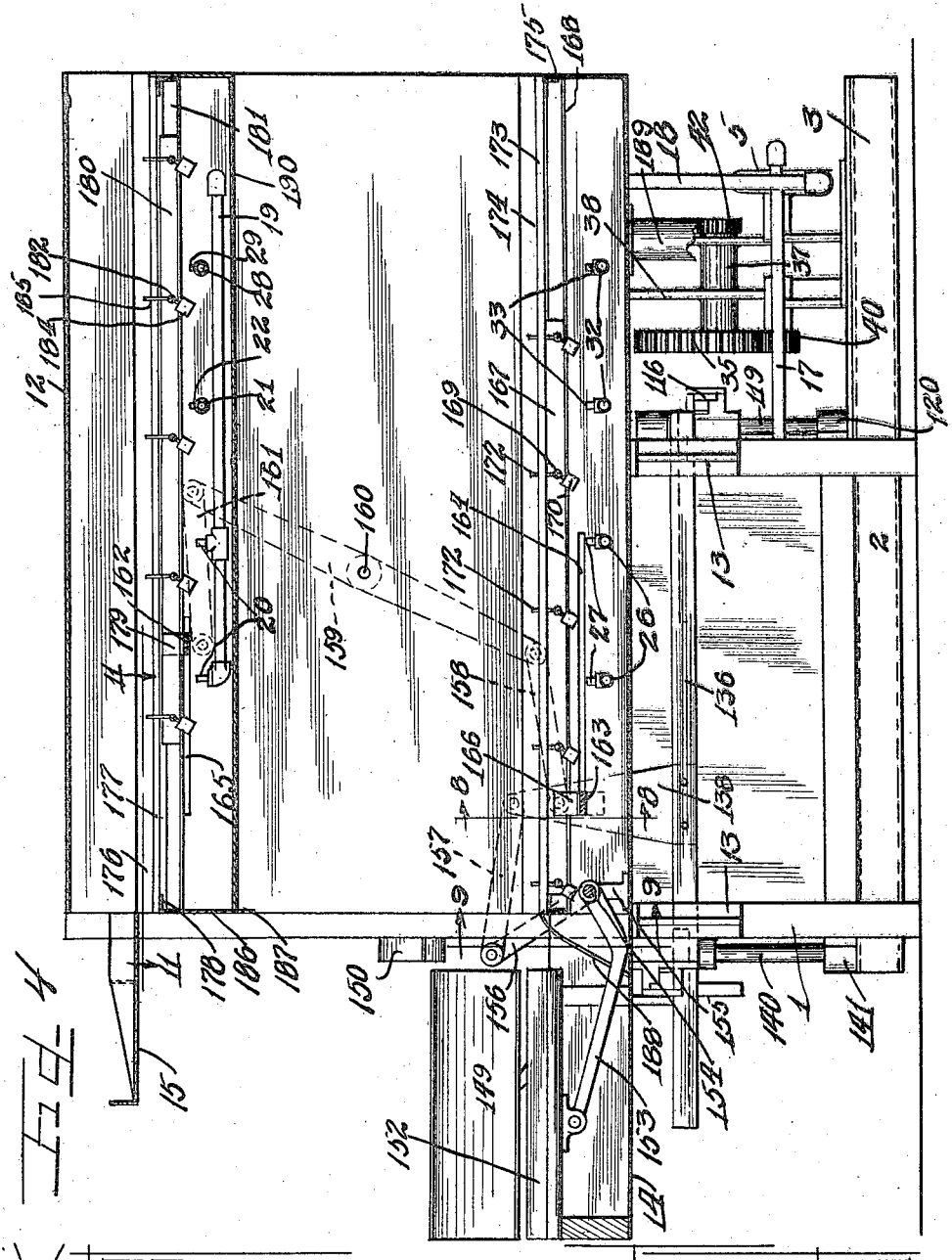

Nov. 16, 1926. 1,606,768
H. C. McLEAN
ICE CREAM CAN WASHING MACHINE
Filed March 18, 1922 9 Sheets-Sheet 5
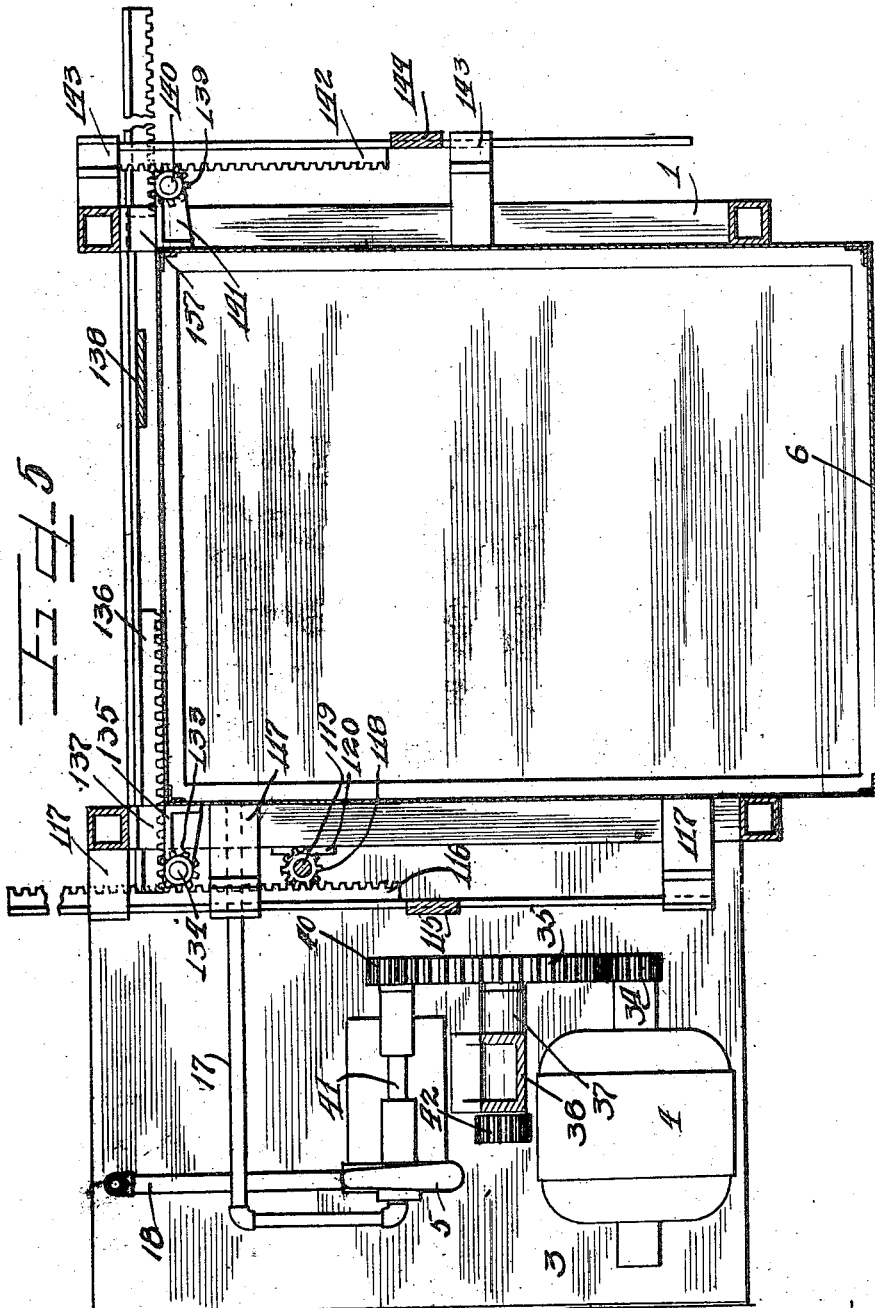

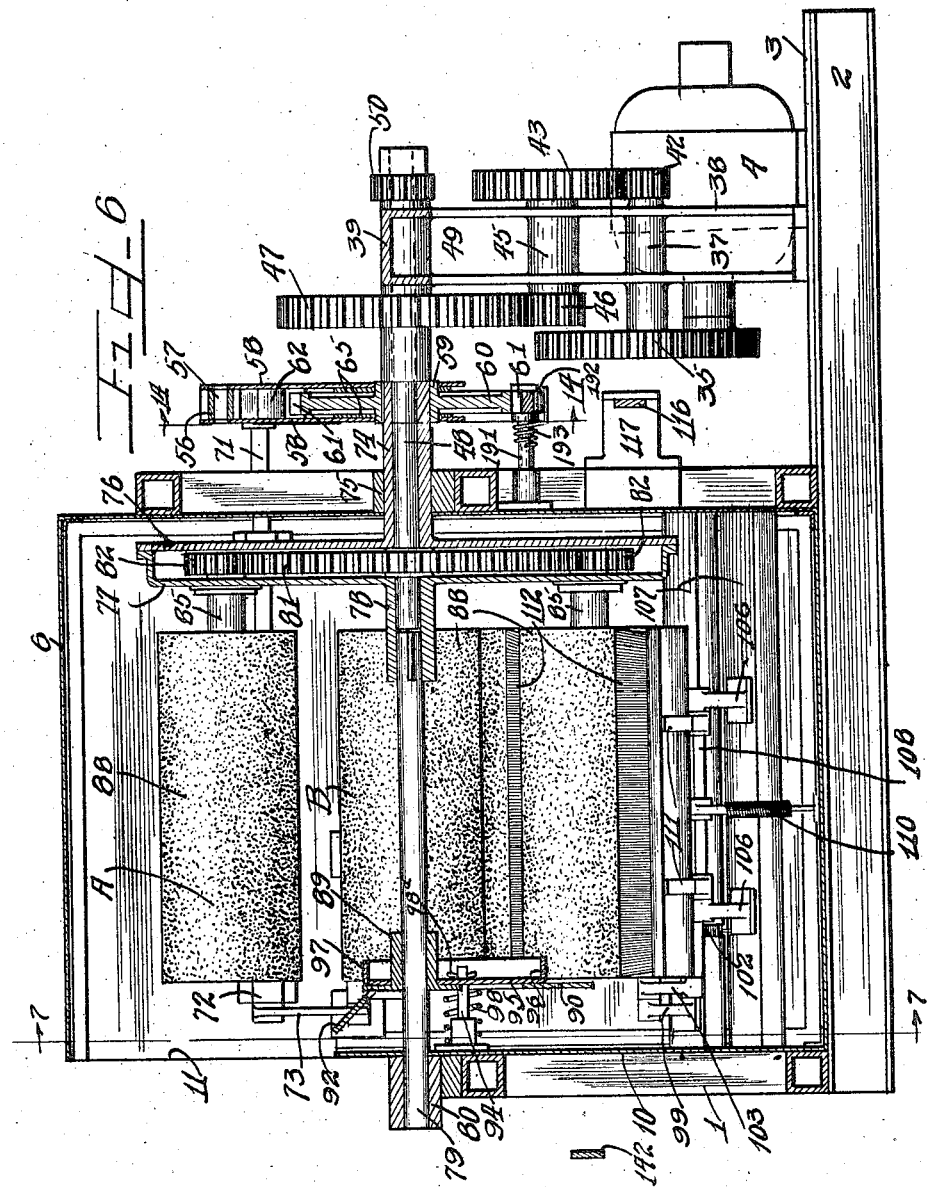

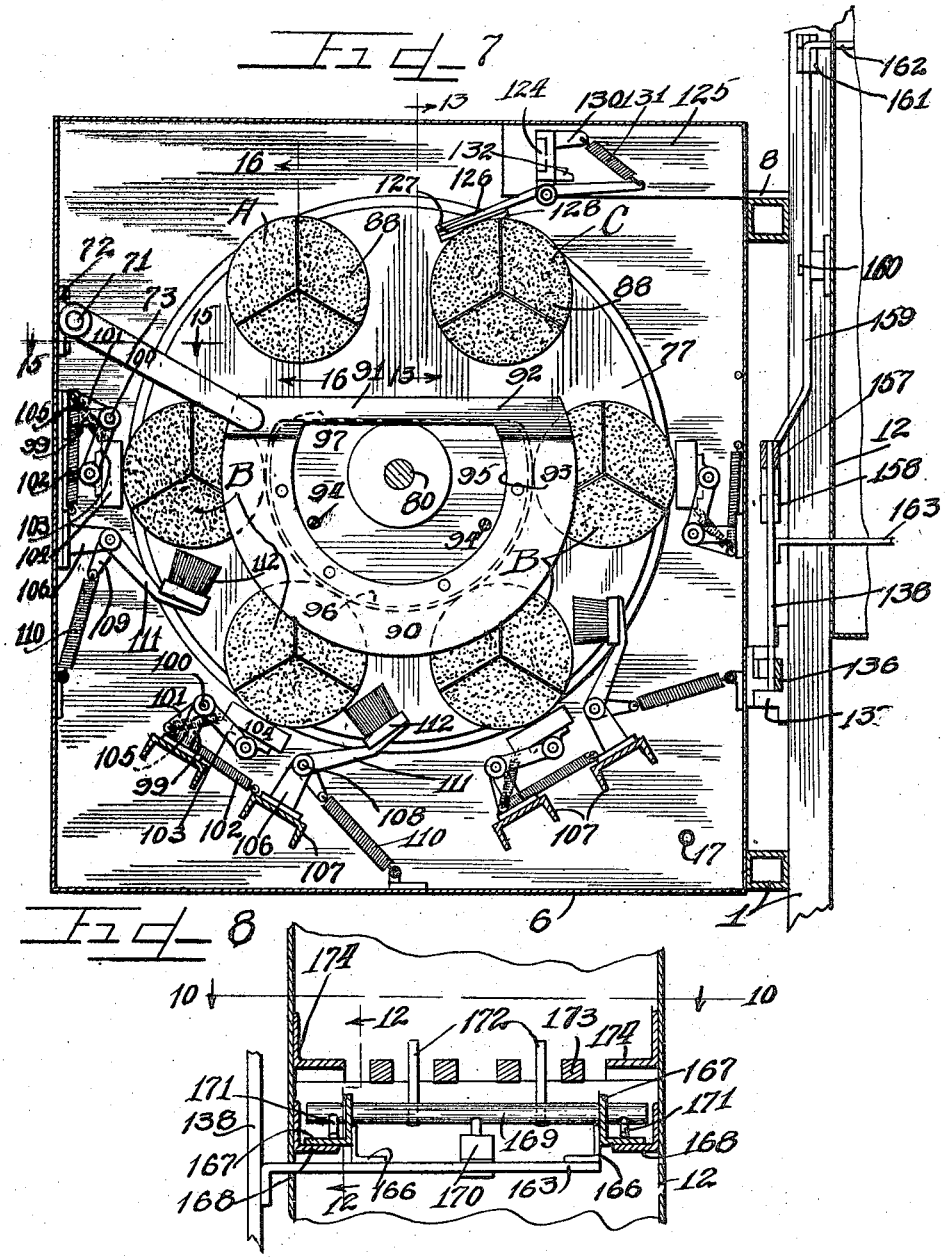

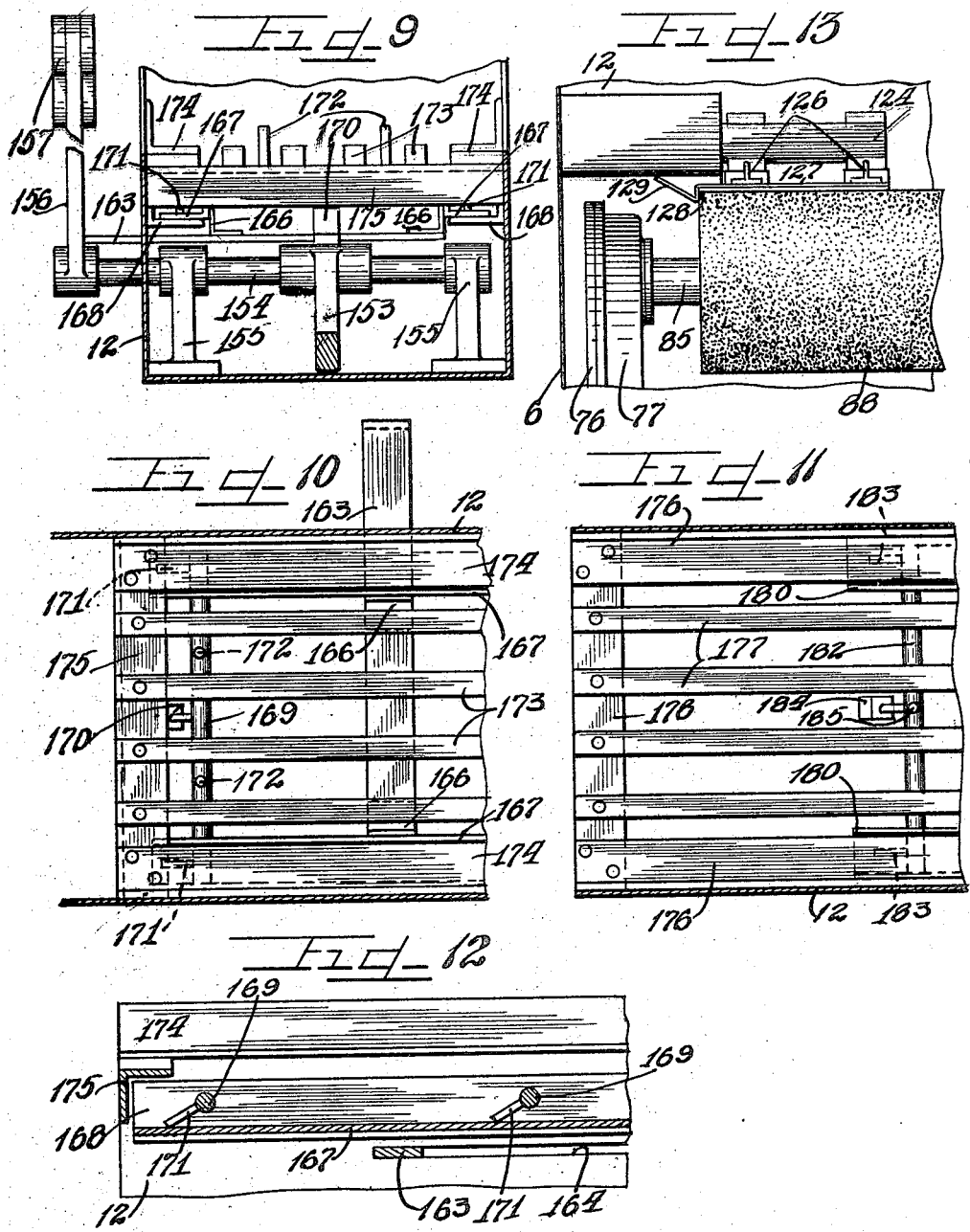

Nov. 16, 1926.
H. C. McLEAN
ICE CREAM CAN WASHING MACHINE
Filed March 18, 1922  9 Sheets-Sheet 9
1,606,768
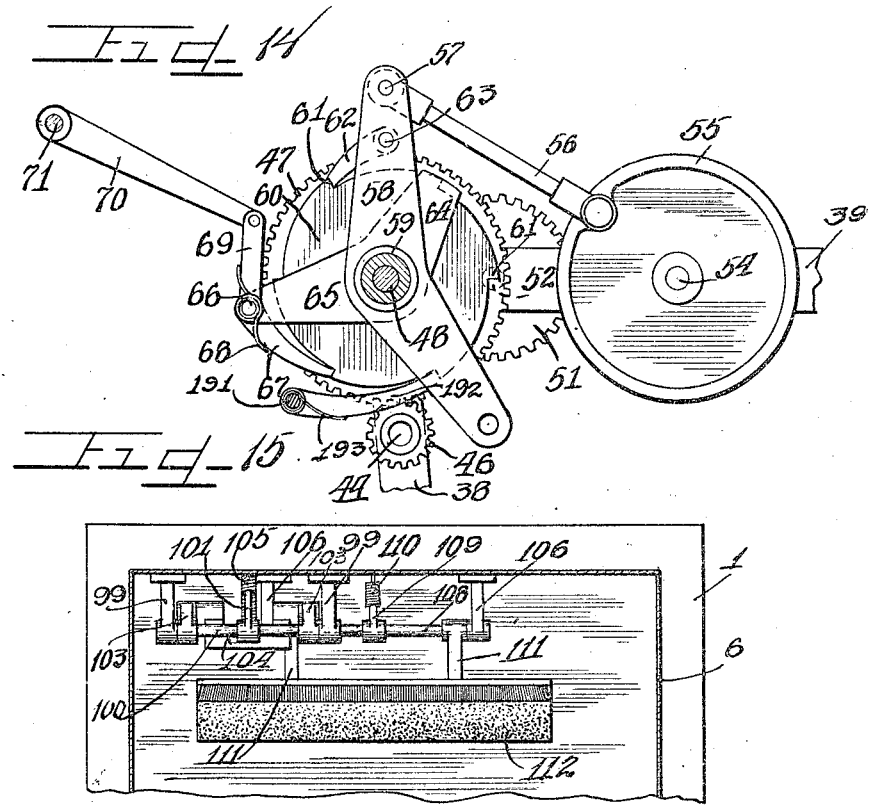
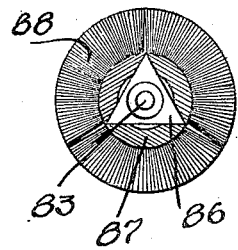
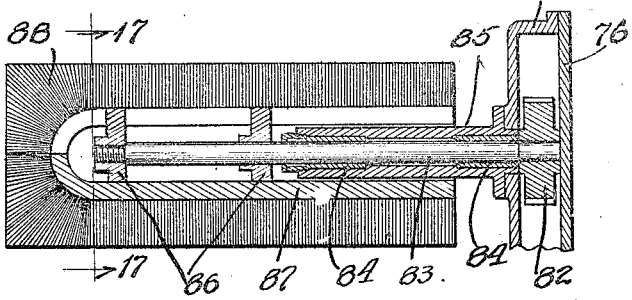

Patented Nov. 16, 1926.

1,606,768

UNITED STATES PATENT OFFICE.

HARRY C. McLEAN, OF CHICAGO, ILLINOIS.

ICE-CREAM-CAN-WASHING MACHINE.

Application filed March 18, 1922. Serial No. 544,705.

This invention relates more particularly to an improved type of ice cream can washing machine adapted to automatically brush both the interior and the exterior of an ice cream can as it is being carried through a cleaning solution on a cleaning brush into a position out of the cleaning solution, to be automatically ejected from the brush and then automatically delivered onto a conveyor in an inverted upright position to permit the brushed can to be first rinsed by sprays of hot water and then sterilized and dried by subjecting the rinsed can to steam before the clean can is discharged from the machine.

It is an object of this invention to provide a machine for automatically washing, rinsing, sterilizing and drying ice cream cans and the covers therefor.

It is also an object of the invention to provide a machine adapted to permit a can to be carried through a washing solution on a rotating traveling brush mechanism alternately through the fields of operation of friction mechanisms and exterior brush mechanisms to permit both the interior as well as the exterior of the can to be cleaned.

Another object of the invention is to construct a machine adapted to permit a can to be applied upon a rotating cylindrical traveling brush to rotate therewith and be carried thereby into a washing solution and into the field of operation of a friction mechanism adapted to hold the can against rotation to permit the brush to rotate therein to clean the interior of the can after which the can is moved out of engagement with the friction mechanism and into the field of operation of another brush mechanism adapted to brush the exterior of the can as it rotates with the carrying brush.

It is a further object of this invention to provide a can washing machine wherein a can after being automatically washed both interiorly and externally while being conveyed through a washing solution is automatically deposited upon a conveyor to be rinsed and sterilized before being discharged from the machine.

It is furthermore an object of this invention to provide a machine adapted to wash both the interior and outer surfaces of a can as it is conveyed through a washing solution in a horizontal position into the field of operation of an ejector adapted to discharge the washed can into a pivoted cradle adapted to deliver the can in an inverted upright vertical position upon a conveyor to permit the can to be rinsed and sterilized before being discharged from the machine.

Still another object of the invention is to provide an automatic can washing machine adapted to simultaneously convey cans and their covers through the machine in different paths to be automatically washed, rinsed and sterilized before being discharged from the machine.

A further object of the invention is to provide an automatic can washing machine having rotatable carrying brushes which cannot be started to travel through a continuous path until a can is properly engaged on a brush in loading position.

Another object of the invention is to provide a can washing machine wherein a single operator may conveniently start the machine, feed cans and can covers thereto and operate a lever which governs the rotation of a disk having can supporting brushes rotatably engaged thereon.

It is an important object of the invention to provide an automatic ice cream can washing machine of improved and effective construction adapted to automatically wash a large number of cans in a given time on both the interior and exterior surfaces of the cans as they are conveyed through a washing solution on rotating brushes from which the washed cans are automatically removed to be rinsed and sterilized while being moved to a position to be discharged from the machine simultaneously with the washing, rinsing and sterilizing of the can covers.

Other and further important objects of the invention will be apparent from the disclosures in the specification and accompanying drawings.

The invention (in a preferred form) is illustrated in the drawings and hereinafter more fully described.

On the drawings:

Figure 1 is a top plan view of a can washing machine partly broken away and embodying the principles of this invention.

Figure 2 is an elevation of the driving end of the machine.

Figure 3 is an elevation of the feeding end of the machine.

Figure 4 is a longitudinal section taken on line 4—4 of Figure 3, showing parts in elevation.

Figure 5 is a horizontal section taken on line 5—5 of Figure 2.

Figure 6 is a vertical longitudinal section taken on line 6—6 of Figure 2, with parts in elevation.

Figure 7 is a transverse vertical section taken on line 7—7 of Figure 6.

Figure 8 is an enlarged fragmentary detail section taken on line 8—8 of Figure 4.

Figure 9 is an enlarged sectional view taken on line 9—9 of Figure 4.

Figure 10 is a plan view taken on line 10—10 of Figure 8.

Figure 11 is a detail plan view taken on line 11—11 of Figure 4.

Figure 12 is a fragmentary detail section taken on line 12—12 of Figure 8.

Figure 13 is a fragmentary view taken on line 13—13 of Figure 7.

Figure 14 is a detail view taken on line 14—14 of Figure 6.

Figure 15 is a detail plan view taken on line 15—15 of Figure 7.

Figure 16 is a longitudinal vertical section of one of the brush mechanisms taken on line 16—16 of Figure 7.

Figure 17 is a cross-section of a brush taken on line 17—17 of Figure 16.

As shown on the drawings:

The reference numeral 1 indicates a framework having rigidly fixed to the lower portion thereof a pair of channel beams 2 which project beyond one side thereof. Supported on the projecting ends of the channel beams 2 is a table or platform 3 having a driving motor 4 and a pump 5 mounted thereon. Mounted upon the framework 1 is a casing 6 having a portion recessed or cut away at 7 to permit a shelf or plate 8 to be fixed upon the upper frame members 9 with a portion of said plate projecting over the platform 3. The casing 6 is closed with the exception of the one side where a wall 10 extends upwardly for only about two-thirds of the height of the casing leaving a feed and discharge opening 11, as shown in Figure 3. The rear uprights of the framework 1 extend upwardly above the top of the casing 6 and have secured to the outer sides thereof a long can and cover rinsing and sterilizing housing 12 open at both ends and supported upon brackets 13 fastened to the lower rear portion of the framework. The upper portion of the housing 12 takes care of the covers while the lower portion of the housing 12 takes care of the cans. At the lower portion of the entrance end of the housing 12, an extension 14 is provided. Secured to the upper portion of the feeding end of the housing 12 is the curved or elbow end of a can cover feed trough or chute 15. The other end of the chute 15 projects forwardly and is supported on a brace or bracket 16 secured upon the top of the casing 6.

The lower portion of the casing 6 serves as a tank for holding a washing solution capable of removing grease and dirt from cans or other articles to be washed. Connected to the lower portion of the tank is one end of a pipe 17, the other end of which is connected to the pump 5. Also connected to the pump 5 is one end of a pipe 18, the upper end of which projects into the upper portion of the housing 12 and connects with a pipe 19 having a plurality of upwardly directed spaced spray nozzles 20 connected therewith. Projecting into the upper portion of the housing 12 is the upper end of a hot water pipe 21 having an upwardly directed hot water nozzle 22 on the inner end thereof. The lower end of the pipe 21 is connected to a control valve 23 to which a hot water supply pipe 24 is connected. Connected to the lower part of the control valve 23 is a pipe 25, the lower end of which is connected to a pair of connected pipes 26 which project into the lower portion of the housing and have hot water spray nozzles 27 attached to the inner ends thereof. Projecting into the upper portion of the housing 12 is the upper end of a steam pipe 28 having an upwardly directed steam nozzle 29 fixed on the inner end thereof. The outer end of the pipe 28 is connected with a stream control valve 30 to which a steam supply pipe 31 is connected. Connected to the steam control valve 30 are a plurality of steam pipes 32 which project into the lower portion of the housing 12 and have steam spray nozzles 33 fixed on the inner ends thereof.

Fixed on the inner end of the motor shaft is a driving pinion 34 which is in mesh with a large gear 35 mounted on the inner end of a stub shaft 36 disposed within a bearing sleeve 37 formed on an upright standard 38. Integrally connected to the upper end of the standard 38 is one end of a horizontal support or beam 39, the other end of which is fixed to the housing 12. The large gear 35 is in mesh with a drive pinion 40 secured on the projecting end of the pump to be operated from the driving motor 4.

Secured on the outer end of the stub shaft 36 is a pinion 42 which is in mesh with a gear 43. The gear 43 is engaged on a stub shaft 44 journalled in a bearing sleeve 45 on the standard 38. Fixed on the inner end of the stub shaft 44 is a pinion 46 which is in driving connection with a large gear 47. The large gear 47 is mounted on a main brush driving shaft 48 which has one end projecting through a bearing sleeve 49 on the upper end of the standard 38. The other end of the main shaft 48 projects into the casing 6 as illustrated in Figure 6. A pinion 50 is fixed on the shaft 48 adjacent the outer end of the bearing 49 and meshes with an intermediate gear 51. The gear 51 is supported on a stub shaft 52 journalled in a bearing on the horizontal beam 39. The intermediate gear 51 is in mesh with a larger gear 53 fixed on a stub shaft 54. The stub shaft is supported in a bearing on the beam 39 and projects inwardly to permit an eccentric wheel 55 to be secured thereon and rotated thereby.

Pivoted on the outer margin of the eccentric wheel 55 is one end of an eccentric rod 56, the other end of which is pivotally connected to a pin 57 between the upper ends of a pair of spaced bell cranks 58. The bell cranks 58 are rotatably mounted on the opposite ends of the hub 59 of a ratchet wheel 60 having six equidistantly spaced peripheral teeth 61, as disclosed in Figure 14. A driving pawl 62 is pivotally supported on a pin 63 between the upper arms of the bell cranks 58 and is positioned to fall by gravity into engagement with the tooth periphery of the ratchet wheel 60. The driving pawl 62 is wider than the ratchet wheel 60 to permit the pawl at times to ride over the ends of the short arms 64 of a pair of spaced auxiliary bell cranks 65. The auxiliary bell cranks 65 are rotatably mounted on the ratchet wheel hub 59 adjacent the inner surfaces of the main bell cranks 58. The bell cranks 58 and 65 are independently movable. The bell cranks 58 are adapted to be oscillated by the eccentric 55, while the bell cranks 65 are operable by means of the handle 73. Supported on a pin 66 between the long arms of the auxiliary bell cranks 65 is a pawl 67 provided with a control spring 68 for holding the same in engagement with the periphery of the ratchet wheel 60. Secured on one end of the pin 66 is one end of a link 69, to the other end of which one end of a lever 70 is pivotally connected. The lever 70 is fixed on one end of a shaft 71 which projects into the casing 6 and is rotatably supported in bearing brackets 72 fastened to the inner surface of the front wall of the casing. A starting lever 73 is fixed on the inner end of the shaft 71 within the casing 6. Fixed on the machine frame 1 is a rigid bar or shaft 191 having pivoted on the outer end thereof a stop pawl 192 held in engagement with the periphery of the ratchet wheel 60 by a spring 193 to prevent reverse rotation of the ratchet wheel and the brush support gear box 76—77.

The hub 59 of the ratchet wheel 60 is keyed or otherwise secured upon a sleeve 74 which is rotatably engaged on the shaft 48 and projects through a frame bearing 75 into the casing 6. Integrally formed on the inner end of the sleeve 74 is a circular disk or plate 76, to which a cover plate 77 is rigidly secured. The plate 76 and the cover 77 form a rotatable gear casing or box within the casing 6. Formed on the gear box cover 77 is a projecting sleeve 78 into which the shaft 48 projects. Also projecting into and keyed to the sleeve 78 is the inner end of a shaft 79 which projects outwardly through the casing wall 10 and is supported in a bearing 80 on the frame 1.

Fixed on the shaft 48 within the gear box 76—77 is a large gear 81 having a plurality of small gears 82 in mesh therewith to be driven thereby and forming a planetary gear arrangement. In the arrangement shown, there are six small gears 82 which are respectively secured on the inner ends of six brush shafts 83 which project through the gear box cover 77 as illustrated in Figure 16.

Each brush shaft 83 projects into the casing 6 through bearing collars 84 supported at spaced intervals within a supporting sleeve 85 secured to the box cover 77. Secured on each brush shaft 83 beyond the sleeve 85 are triangular blocks 86 upon which a cylindrical brush core 87 is secured. The brush core comprises a plurality of brush block members engaged around the sleeve 85 and secured to the blocks 86 by screws or other suitable means. Flexible brush bristles are secured to the outer surfaces of the brush core 87 to form a cylindrical brush 88 with bristles at the closed end of the core, as shown in Figure 16. It will thus be noted that the rotatable gear box 76—77 carries six interior can brushes upon which cans to be cleaned are adapted to be engaged as hereinafter described. Referring now to Figure 7, "A" is the can loading position, "B" are the can brushing positions, and "C" is the can ejecting position.

Engaged on the shaft 79 between the casing wall 10 and the outer ends of the brushes 88 is a slidable collar 89 on which a disk 90 is formed (Figures 6 and 7). The disk 90 has a segment thereof cut away along a cord 91. The margin of the disk along the cord 91 is bent outwardly to afford an inclined flange or apron 92. The disk 90 is provided with a curved opening 93 through which pins or stub shafts 94 project. The stub shafts 94 are secured on the inner surface of the casing wall 10 and project through apertures in a plate 95 positioned on the collar 89 and secured to the inner surface of the disk 90. The plate 95 is provided with an integral curved flange 96 and a straight flange 97. The curved flange 96 affords a guide on which the cams may roll. Coiled springs 98 are engaged around the stub shafts 94 between the casing wall 10 and the plate 95 to resiliently hold said disk 90 against the can bottoms. Cotter pins 98$^a$ are engaged through the ends of the stub shafts 94 and act as stops for limiting the inward movement of the plate 95 and the disk 90. The stub shafts 94 act to hold the disk 90 and the plate 95 against rotation with shaft 79. The plate 95 and disk 90 are resiliently held by the springs 98 against the cotter pins 98$^a$ and afford a means for holding cans in place on the brushes 88.

Mounted in the casing 6 at each "B" brush position is a pair of brackets or arms 99 supporting a rotatable shaft 100. Fixed on the middle of the shaft 100 is a lever 101 having a coiled spring 102 connected to the end thereof. The spring 102 is also connected to the casing 6 or to any suitable stationary member therein. Fixed on the ends of the shaft 100 to the inside of the bracket arms 99 are two levers 103 having pivotally supported therebetween a friction block or pad 104. Connected to the friction block 104 is one end of a coiled spring 105, the other end of which is connected to the lever 101. The springs 102 and 105 act to hold the friction block adjacent the peripheral surface of a brush 88 as illustrated in Figure 7.

An exterior can brushing mechanism is also provided at each of the first three "B" positions and comprises a pair of bracket arms 106 permanently secured to the interior of the casing or on permanent channel supports 107 mounted therein. The bracket arms 106 support a rotatable shaft 108 having a short lever 109 fixed to the middle thereof. Connected to the short lever 109 is one end of a coiled spring 110, the other end of which is connected to the interior of the casing 6. Secured to the shaft 108 to the inside of the bracket arms 106 are a pair of brush arms 111 at an angle to the short lever 109. Connecting the outer ends of the brush arms 111 is a long bristle brush 112 held in the path of the traveling brushes 88 by the spring 110.

Supported by the lower ends of the bell cranks 58 is a pin 113 which projects through a vertical slot 114 formed in an arm 115. The lower end of the arm 115 is rigidly secured to a horizontal rack 116 which is slidably supported by brackets 117 to slide transversely of the machine. Meshing with the reciprocating rack 116 is a pinion 118 which is fixed on a long vertical rod or shaft 119 journalled in bearings 120 secured to the machine frame 1. Fixed on the upper end of the vertical shaft 119 is a gear 121 which meshes with a discharge or ejector rack 122. The rack 122 is slidably mounted to reciprocate in guide brackets 123 secured upon the plate 8 as illustrated in Figure 1. One end of the rack 122 has an extension bar 124 which sildably projects through an opening in the casing wall at 125. The rack extension bar 124 projects into the casing 1 above the can ejecting position "C" and has pivoted thereon a pair of spaced bell cranks 126. Connecting the two bell cranks 126 is a guide plate 127 one end of which is bent to form a hook 128 terminating in an inclined flange 129 as shown in Figure 13. Fixed on the inner end of the rack extension bar 124 are castings having arms 130. Connecting the arms 130 with the bell cranks 126 are coiled springs 131 which act to hold the ejector guide plate 127 in contact with the brush 88 when in position "C". Stops 132 are also formed on the castings on the rack extension bar 124 to limit the swing of the bell cranks 126 by the springs 131.

Also meshing with the rack 116 is a pinion 133 fixed on a rotatable vertical stub shaft 134, the ends of which are journalled in a bracket 135 mounted on the machine frame. The pinion 133 is also in mesh with a longitudinally reciprocating rack 136 slidable in brackets 137 secured to the machine frame. Fastened to the rack 136 is an upright arm 138 for operating mechanisms positioned within the housing 12 as hereinafter described. Operated by the rack 136 is a pinion 139 which is fixed on a vertical shaft 140 journalled in supporting bearings 141 secured to the machine frame and shown in Figure 3. The pinion 139 is also in mesh with a horizontal transversely slidable rack 142 supported in guide brackets 143 mounted on the machine frame. Fixed on the rack 142 is a downwardly projecting arm 144 having a slot 145 therein. Projecting through the slot 145 is a pin 146 supported on the lower end of a bell crank lever 147 which is pivotally supported intermediate its ends upon the machine frame on a pin 148. Fixed on the upper end of the bell crank lever 147 is a curved receiving scoop or tray 149. Secured to the casing wall 10 at the position "C" is a stationary can receiving tray 150 having a deflected mouth piece 151 at the inner end thereof.

When the lever 147 is in a lowered position as illustrated in Figure 3, the tray 149 is tipped to permit a cleaned can thereon to roll therefrom onto a cradle 152 adapted when in a receiving position to seat on cross members of the housing extension 14. Pivotally attached to the bottom of the cradle 152 is the outer end of a bent arm 153, the inner end of which is fixed on a rod or shaft 154. The shaft 154 is disposed transversely of the lower intake end of the housing 12 and is journalled in supports or bearing members 155 secured upon the bottom of the housing 12, as shown in Figures 4 and 9. The shaft 154 projects through an aperture in the inner wall of the housing 12 and has secured on the projecting end thereof a lever or link 156. Pivoted to the other end of the lever 156 is one end of a link 157, the other end of which is pivotally connected to the upper end of the upright arm 138. The arm 138 is adapted to be actuated by means of the reciprocating rack 136. Also pivoted on the arm 138 is one end of a link 158, the other end of which is pivotally connected to the lower end of a deflected lever or beam 159. The beam 159 is pivotally supported intermediate its ends on a pin 160 supported on the housing 12. The upper end of the beam 159 has pivotally connected thereto one end of a link 161, the other end of which is pivoted to the outer angled end of a slide bar 162. The slide bar 162 projects into the housing 12 through a longitudinal slot 165.

Fastened to the upright arm 138 is the flanged outer end of a slide bar 163 which projects into the housing 12 through a longitudinal slot 164. Rigidly fastened on the bar 163 are two angle brackets 166, to the upright flanges of which a pair of horizontal angle bars 167 are fastened. The angle bars 167 are slidably supported on the horizontal flanges of a pair of angle rails 168 rigidly secured on the inner walls of the housing 12. Rotatably supported transversely on the slidable bars 167 are a plurality of rods 169 each having a counterweight 170 supported centrally thereof. Secured to each end of each rod 169 is a stop peg or pin 171 which is held against the horizontal flange of the slidable bar 167 to limit the rotation of the rod in one direction due to the action of the counterweight 170. Also secured to each rod 169 between the angle bars 167 are two projecting can feed pegs or pins 172 which are held in upright position by the counterweight when the stop pins 171 rest against the slide bars 167 as illustrated in Figure 8.

The feed pegs 172 of the slide frame, formed by the bars 167 and the rods 169, project upwardly between spaced horizontal stationary grate bars 173 which are secured longitudinally in the lower parts of the housing 12 above the slide frame. Forming part of the stationary grate are a pair of angle bars 174 which are fixed upon the walls of the housing 12 above the angle bars 168. The grate formed by the bars 173 and the angle bars 174 is adapted to afford a support for cleaned cans as they are moved through the housing 12 by the pegs 172 of the reciprocating feed frame. The ends of the grate bars 173 and the angle bars 174 are secured to transverse braces or supports 175 secured transversely of the housing 12.

Mounted within the upper portion of the housing 12 is a can cover feed mechanism comprising a stationary horizontal grate embracing side angle bars 176 and a plurality of spaced bars 177. The ends of the bars 176 and 177 are secured to cross members 178 disposed transversely in the housing 12. A can cover feed mechanism is positioned below the upper grate and is secured to the slide bar 162 similar to the arrangement illustrated in Figure 8 for the can feed mechanism. Fixed on the slide bar 162 are angle braces 179 to which angle bars 180 are secured. The angle bars 180 are slidable upon the horizontal flanges of angle rails 181 secured to the inner side walls of the casing 12 below the angle bars 176. Rotatably supported by the slidable angle bars 180 are a plurality of transverse rods or shafts 182 having stop pegs or pins 183 fixed near the ends thereof to contact the horizontal flanges of the angle bars 180 to limit the rotation of said shafts 182 in one direction. The pegs 183 are held against the angle bars 180 by the action of counterweights 184 secured to the middle portions of the shafts 182. Fixed on each shaft 182 is a cover feed peg or pin 185 which projects upwardly between the two middle grate bars 177. Mounted within the upper portion of the housing 12 is a horizontal partition or floor 190 to prevent the cleaning solution and water from the nozzles 20 and 22 from flowing into the lower portion of the housing 12.

As illustrated in Figure 3, a plate 186 is secured across the upper portion of the inlet end of the housing 12 below the cross member 178. Integral with the lower edge of the plate 186 is a lug or projecting finger 187. The lug 187 serves as a stop against which the cradle 152 is adapted to engage to limit the upward swing of said cradle.

Attached to the intake end of the lower stationary grate in the housing 12 is the upper end of a curved guide apron 188 which is slotted to permit operation of the bent cradle lever 153.

Fastened in the bottom of the housing 12 is a discharge pipe 189 to permit liquids to be drained from the housing.

The operation is as follows:

The ice cream can washing machine is operated from the motor 4 which drives the pump 5 through the intermeshing gear members 34, 35 and 40. Rotation of the gear 35 causes rotation of the gear 43 by the pinion 42. From the gear 43 the drive is transmitted to the pinion 46 which being in mesh with the large gear 47, rotates the same at a low rate of speed. The shaft 48 is thus rotated thereby causing rotation of the large gear 81 within the rotatable gear box 76—77. Since all of the small gears 82 within the gear box are in mesh with the large gear 81, said gears 82 are rotated, thus causing rotation of all of the brush shafts 83 and the can brushes 88 supported thereon. The brushes 88 have two movements, one of displacement, and the other axially rotary at proper times during the movement of displacement.

An operator positioned at the open end of the casing 6 manually removes a cover from a dirty ice cream can and places the cover in the feed trough or chute 15. The ice cream can is then pushed onto the rotating can brush 88 in the position "A" until the outer end of said brush contacts the inner surface of the can bottom. With the can thus properly engaged on the brush, the can and brush will rotate together.

Referring now to Figure 2, it will be noted that when the shaft 48 is rotated, that the pinion 50 thereon is also rotated, thereby causing a drive to be transmitted to the eccentric wheel 55 through the gears 51 and 53. The eccentric rod 56 is thus operated, thereby causing the same to rock the bell cranks 58 back and forth. The pin 113 carried by the bell cranks 58 acting in the slotted arm 115 causes the rack 116 to reciprocate. In the lowered position of the control lever 73 shown in Figure 3, the bell cranks 65 are positioned as illustrated in Figure 14. It will thus be noted that as the upper arms of the bell cranks 58 are pulled toward the eccentric wheel 55 that the pawl 62 will ride up onto the curved ends of the short arms 64 of the bell cranks 65. The pawl 62 is thereby held from dropping by gravity behind the next tooth of the ratchet wheel 60. The ratchet wheel 60 thus remains stationary.

To cause the can and brush in position "A" to advance into the first position "B", the operator swings the control lever 73 upwardly from the position shown in Figures 3 and 7. The shaft 71 is thereby partially rotated to swing the lever 70 upwardly from the position illustrated in Figure 14. Upward movement of the lever 70 actuates the link 69 thereby causing the bell cranks 65 to swing or partially rotate to lift the pawl 67 to engage behind the next tooth and move the short bell crank arms 64 toward the eccentric wheel 55 and away from the ratchet wheel tooth previously protected thereby. The pawl 67 prevents the bell crank 65—64 from moving back into the position illustrated in Figure 14. The next half revolution of the eccentric wheel 55 will now draw the pawl 62 into a position to engage behind the next ratchet tooth. With the completion of the revolution of the eccentric wheel 55 the upper arms of the bell cranks 58 are moved away from the eccentric wheel, thereby causing the pawl 62 to advance the ratchet wheel 60 one-sixth of a revolution. As this is done, the pawl 67 follows the rotation of the ratchet wheel and the lever 70 and the control lever 73 falls back into normal position by gravity ready for the next operation.

A sixth rotation of the ratchet wheel 60 thus causes the gear box 76—77 to be rotated one-sixth of a revolution, thus advancing the can and its supporting brush from position "A" to the first position "B".

As the can approaches the first position "B", it moves into frictional contact with the flange 96 of the plate 95 and also into frictional engagement with the spring controlled pivoted block 104. The friction between the brush 88 and the can is less than the friction between the can and the friction block 104 and the flange 96. The can is therefore held against rotation while the brush within the can continues to rotate thereby brushing or cleaning the interior surfaces of the can.

A second can is now placed upon the brush just advanced into position "A" and the can cover is placed in the chute 15 pushing the first cover further in. The control lever is again operated thereby causing the gear box 76—77 to again rotate a sixth of a revolution. The first can in the first position "B" is accordingly advanced another sixth of a revolution thereby passing out of the field of operation of the first friction block 104 through the field of operation of the first exterior brush 112. After leaving the first friction block 104, the friction between the brush 88 and the partially cleaned can is greater than the friction between the exterior of the can and the flange 96 and the brush 112. The can is thus again rotated with the brush 88 thereby permitting the resiliently supported exterior brush 112 to brush or sweep the exterior surface of the can.

As the can is lowered or advanced through the casing it is gradually submerged into a cleaning solution, which will permit the can to be thoroughly scrubbed both inside and out by the cleaning brushes. With each operation of the lever 73 the can is moved from one "B" position to another, thereby being alternately scrubbed interiorly and exteriorly a number of times before the can leaves the cleaning solution and is advanced from the last "B" position out of the cleaning solution into the position "C".

It will be noted that a plurality of ice cream cans may be washed simultaneously and that it is necessary to manually operate the control lever 73 each time it is desired to cause the brush carrying cans to advance from one position into another. Attention is also directed to the fact that the control lever 73 is so positioned that the same cannot be swung upwardly past the bottom of a can on the brush in position "A" unless the can is properly engaged on said brush. This arrangement therefore prevents accidents and insures proper positioning of the cans on the carrying brushes 88.

As a can is advanced from the last "B" position into position "C", it moves under the spring controlled ejector plate 127 when in the retracted position illustrated in Figure 1. The hook 128 of the ejector plate 127 is thus engaged back of the open edge of the cleaned can. It will be remembered that the rack 116 is reciprocated when the motor is operating so that the pinion 118 in mesh with the rack is alternately rotated in opposite directions. Since the pinion 118 is fixed on the upright shaft 119, said shaft and the gear 121 on the upper end thereof are also alternately rotated in opposite directions. The upper discharge rack 122 is thus reciprocated and as a cleaned can is moved into the position "C" in engagement with the ejector plate hook 128, the discharge rack 122 is advanced from the retracted position shown in Figure 1 toward the open or feeding end of the casing 6. The hook 128 thus acts to push the cleaned can off of the brush 88 over the stationary tray 150 and into the tray 149 which comes into position adjacent the stationary tray 150 at this stage of the operation. The inclined flange 151 on the stationary tray 150 permits a can being discharged to slide upon said tray 150, which serves as a stay or support for the partly ejected can until the tray 149 reaches a receiving position.

The rack 142 which causes swinging of the tray lever 147 about the pivot pin 148, is reciprocated by the action of the pinion 139 and the gear rack 136. The gear rack is operated by the pinion 133 which is in mesh with the reciprocating rack 116. As soon as a cleaned can is discharged into the tray 149, the can discharge mechanism is retracted over the brush 88 in position "C". The inclined flange plate 129 is provided to permit the discharge plate 127 and the hook 128 to ride over the brush without injury thereto, or up over a can on said brush if for some reason the can is not properly ejected.

When the lever 73 is again operated to cause the brush 88 in position "C" to be advanced into position "A", the rack 142 is moved into the position shown in Figure 3, thereby causing the upper end of lever 147 to swing rearwardly or downwardly into a position to permit the can in the tray 149 to roll into the cradle 152 seated upon the extension 14 of the housing 12.

When a can is deposited into the cradle 152, the rack 136 is in the position illustrated in Figure 4. The rack 136 is reciprocated due to the alternate rotation of the pinion 133 by the rack 116. As the rack 136 moves inwardly from the position shown in Figure 4, the upright arm 138 fixed thereon is also moved inwardly, thereby causing operation of the links 156 and 157 to partially rotate the shaft 154. The bent arm 153 is thus swung upwardly about the shaft 154, thereby elevating the can carrying cradle 152. The arm 153 is connected to the bottom of the cradle nearer the outer end thereof thereby permitting the inner end of the cradle to tip downwardly as the cradle is elevated. When the cradle is sufficiently inclined, the can thereon will slide downwardly until the open end engages the guide apron 188. The cradle 152 continues to swing upwardly until the upper end thereof strikes against the lug 187, the can having previously passed beneath said lug. The upper end of the cradle engaging against the lug 187 causes the lower end of said cradle to swing inwardly thereby pushing the can onto the guide grate. The lower end of the inverted can is thus positioned on the guide grate formed by the members 173 and 174 to permit the first pair of upwardly projecting pegs 172 to engage in back or to the outside of the inverted can, thereby acting to push the can over the guide grate. The continued inward movement of the rack 136 causes the bar 163 secured on the upright arm 138 to slide the feeding frame formed by the members 167 and 169 inwardly over the guide rails 168. Since the stop pins 171 track on the horizontal flanges of the angle bars 168, the pegs 172 are prevented from swinging outwardly and accordingly continue to advance the same through the housing 12 over the grate. The outward movement of the rack 136 returns the cradle to its position upon the housing extension 14 and also moves the slidable feeding frame back into normal position. As this is done, the upright pegs 172 are tripped when they come in contact with a can thereby permitting a can to stand upon the guide grate until the next operation.

A series of cans after being washed are thus successively delivered in an inverted position upon the guide tray and are intermittently advanced over said guide tray toward the discharge end of the housing 12. Referring to Figure 4, it will be noted that as the inverted cans are advanced over the guide tray, they first pass over the nozzles 27 from which hot water is sprayed upwardly into and around the cans to thoroughly rinse the scrubbed cans. After being rinsed the inverted cans are advanced over the steam jets or nozzles 33 and are sterilized by the steam issuing from said nozzles. When a washed can has been rinsed and sterilized as described, it finally reaches the end of the housing 12 and is discharged. The can, thoroughly cleaned, rinsed and sterilized when discharged from the housing 12, may be manually handled, or it may be discharged into a suitable chute or upon a conveyor to be delivered to a desired point.

Mention has been made of the fact that just previous to the time that a dirty can is placed upon a brush 88 in position "A" that the cover of said can is placed in the inlet chute 15. As additional covers are deposited in said chute 15, the covers previously placed therein are gradually pushed inwardly toward the intake end of the housing 12. The can covers are thus intermittently fed onto the upper guide tray 176— 177 into the field of operation of the feed pegs 185 which are mounted on the reciprocating feed frame formed by the members 180 and 182. The upper or cover feed frame is actuated by means of the swinging arm 159 pivoted at 160 and connected to be actuated by the reciprocating rack 136. As a cover is moved into the field of operation of the first peg 185, the peg is tripped when the feed frame moves toward the chute 15 to permit the peg to project up into the cover. Upon the inward movement of the cover feed frame, the peg 185 within the cover is prevented from tipping forwardly by the pins 183. A cover is thus intermittently advanced by the pegs 185 over the upper guide grate. As a cover is advanced through the housing 12, it is first passed over the nozzles 20 through which a cleaning solution from the casing 10 is forced by the action of the pump 5 operated by the motor 4. The cleaning solution is thus sprayed against the can cover to wash the same. With the advance of a cover over the upper guide grate, said cover after being washed is moved into a position over the nozzle 22 which acts to spray clean hot water against the cover to thoroughly rinse the same. After a washed cover has been rinsed, it is advanced to a position over the steam nozzle 29 to be sterilized by the steam issuing from said nozzle. After the sterilizing of a washed cover, the same is pushed from the upper guide tray and is discharged from the discharge end of the housing 12. The cleaned can covers when discharged may be deposited in a suitable delivery chute or upon a conveyor to be delivered to a desired point.

The cleaning solution, hot water and condensed steam used in the housing 12 on the can covers are permitted to be drained from the upper portion of the housing over the floor 190 back into the casing 6 by means of a drain pipe or other suitable means.

From the description hereinbefore given, it will be noted that a plurality of ice cream cans and the covers thereof are adapted to be automatically washed, rinsed and sterilized before being discharged from the machine. While in the present showing of the machine, six can carrying brushes 88 are disclosed, it will, of course, be understood that the machine may be arranged to take care of a less or greater number of can carrying brushes as desired. The can carrying brushes 88 are continuously rotated when the motor is in operation, but are only advanced through the various positions "A", "B" and "C" in the casing 6 when the control lever 73 is moved into an elevated position. The return of the control lever 73 after each operation thereof is automatic so that an operator after raising the lever may give his attention to feeding the next can and its cover into the machine. A large number of cans and covers may be thoroughly cleaned and sterilized by the improved machine without requiring an operator's hands to come into contact with the cleaning solution. It will be understood that any desired mixture suitable for thoroughly cleaning the cans and covers may be used in the tank 6. If desired, the cans after being sterilized may be subjected to a hot air blast and dried before being discharged from the housing 12.

Even though the machine is constructed to handle a plurality of cans and covers simultaneously, a single can and cover may be advanced through the machine. To start the feeding of the can covers through the housing 12, the first cover may be manually pushed into the field of operation of the feeding pegs 185. A single can is automatically conducted through the machine the same as a plurality of cans.

The machine is adapted to clean or scrub both the interior and exterior surfaces of cans as a can is being advanced through the machine on brushes which act to scrub the interior surfaces of the cans. Each can is repeatedly scrubbed alternately on the inside and on the outside due to the arrangement of the cleaning brushes and the friction mechanism through the fields of operation of which the cans travel.

It will, of course, be understood that containers other than ice cream cans and covers may be automatically washed, rinsed and sterilized by the machine, and that various changes may be made in construction to adapt the machine to handle containers of different shapes than ice cream cans and still be within the scope of this invention.

I am also aware that numerous other details in construction may be varied through a wide range without departing from the principles of this invention, and I therefore do not purpose limiting the patent granted otherwise than necessitated by the prior art.

I claim as my invention:

1. A can washing machine comprising a casing, a rotatable support therein, can carrying brushes on said rotatable support, means for rotating said brushes, a pawl and ratchet mechanism for rotating said support step by step, and an eccentric mechanism connected to drive the pawl and ratchet mechanism, said brushes and the driving means therefor having two movements, one of displacement and the other axially rotary.

2. A can washing machine comprising a casing, a rotatable support therein, can carrying brushes supported on said support, gear mechanisms in said support connected with said brushes, means for rotating said gear mechanism to cause axial rotation of the brushes, means for causing said support to rotate to advance the brushes through the casing, an eccentric device connected with said last mentioned means to operate the same step by step, and motor driven gear mechanisms for driving the eccentric device.

3. A can washing machine comprising a casing containing a washing solution, a box supported therein, a plurality of can carrying brushes rotatably supported on said box, small gears in said box connected with said brushes, a large gear in said box meshing with all of said small gears, means for driving said large gear to cause rotation of the small gears and axial rotation of said brushes, a pawl and ratchet mechanism connected with the box for rotating the same to displace the brushes while axially rotating through the washing solution, an eccentric means connected to drive the pawl and ratchet mechanism, gear means for driving the eccentric means, and a motor for operating the gear means.

4. A can washing machine comprising a casing for containing a washing solution, a gear box rotatably supported within the casing, can carrying brushes supported on said box, small gears in said box connected with said brushes, a large gear in said box meshing with said small gears, means for driving the large gear to cause axial rotation of said brushes, a pawl and ratchet mechanism connected with the box for rotating the same to advance the brushes through the washing solution, a manual control therefor, and an eccentric mechanism operated by said means for operating said pawl and ratchet mechanism.

5. A can washing machine comprising a casing for containing a washing solution, a gear box rotatably supported therein, can carrying brushes supported on said box, gears in said box connected with said brushes, means for driving said gears to cause rotation of said brushes, a pawl and ratchet mechanism connected with the box for rotating the same to advance the brushes through the washing solution, an eccentric mechanism driven by said means connected to drive the pawl and ratchet mechanism, and a manually operated device for controlling the operation of said pawl and ratchet mechanism by said eccentric mechanism.

6. A can washing machine comprising a casing for containing a washing solution, a gear box therein, can carrying brushes supported on the gear box, gears in said box connected with said brushes, means for driving said gears to cause rotation of said brushes and the cans thereon, a pawl and ratchet mechanism connected with the box for rotating the same to advance the brushes and cans through the washing solution, an eccentric mechanism driven by said means connected to drive the pawl and ratchet mechanism, a device for controlling the operation of said pawl and ratchet mechanism, friction mechanisms in said casing for holding the cans against rotation to permit the rotating brushes to rotate with respect to the cans to clean the interior surfaces of the cans, and exterior brushes in said casing adapted to clean the exterior surfaces of the cans when said cans move out of engagement with said friction mechanisms.

7. A can washing machine comprising a casing, can carrying brushes rotatably supported therein, means for rotating and advancing the brushes through the casing, mechanisms in the casing for holding the cans against rotation to permit the rotating brushes to clean the interior of the cans, and pivotally supported brushes mounted in said casing adapted to clean the exterior of said cans when the cans are released by said mechanisms and rotate with the carrying brushes.

8. A can washing machine comprising can carrying brushes, means for rotating and advancing the brushes, friction devices for holding the cans stationary with respect to said brushes to permit said brushes to rotate in said cans to clean the interior of said cans, and means for cleaning the exterior of said cans when the cans are moved out of the field of operation of said friction devices and rotate with said brushes.

9. A can washing machine comprising can carrying brushes, mechanisms for rotating the brushes and intermittently advancing the same while rotating, mechanisms for engaging the cans to hold the same against rotation to permit the brushes to rotate therein to clean the interior of the cans, and spring controlled brushes disposed in the path of advance of said cans to clean the exterior of the cans when the cans rotate with the carrying brushes.

10. A can washing machine comprising can carrying brushes, mechanisms for rotating the brushes and advancing the same while rotating, spring controlled means for holding the cans on said brushes, devices for resiliently engaging the cans to hold the same against rotation to permit the brushes to rotate therein to clean the interior of the cans, and spring controlled pivotally mounted brushes disposed in the path of advance of said cans to clean the exterior of the cans when the cans move out of the field of operation of said devices and rotate with the carrying brushes.

11. A can washing machine comprising can carrying brushes, mechanisms for rotating and advancing the brushes and the cans thereon, guide means with which the cans have rolling contact spring controlled pivotally mounted arms disposed in the path of the rotating brushes and cans, and friction blocks pivoted on said arms to frictionally engage the cans to hold the same to permit the brushes to rotate therein to clean the cans.

12. A can washing machine comprising can carrying brushes, a mechanism for rotating said brushes and the cans thereon, means for conveying said brushes and cans through a circular path, friction mechanisms disposed on opposite sides of the path of said brushes to hold said cans against rotation, and cleaning means disposed in the path of said brushes.

13. In a can cleaning machine the combination with a rotatable device, of shafts rotatably supported thereon, brushes secured on said shafts to rotate therewith, said brushes adapted to have cans engaged thereon, friction mechanisms positioned to engage said cans to hold the same against rotation to permit said rotating brushes to clean the interior of said cans, and spring controlled pivoted brushes adapted to brush the exterior of said cans when out of contact with said friction mechanisms.

14. In a can cleaning machine the combination with a rotatable device, can carrying brushes rotatably supported thereon, means for holding said cans against rotation at intervals to permit cleaning of the interior of said cans by said brushes, mechanisms disposed to act alternately with said means for the purpose of cleaning the exterior of said cans when rotating with said brushes, and an ejector mechanism positioned to discharge cleaned cans from said brushes.

15. In a can cleaning machine the combination with a rotatable device, brushes rotatably supported thereon and carried thereby through a path, said brushes adapted to have cans manually engaged thereon at a particular position in said path, alternately arranged mechanisms disposed along the path of said brushes to permit the cans to be cleaned both interiorly and exteriorly, and ejector mechanisms positioned at a predetermined point in said path to automatically discharge cleaned cans from said brushes.

16. A can cleaning machine comprising a casing containing a washing solution, a rotatable device in said casing, rotatable can carrying members on said device, mechanisms disposed in the path of said carrying members to cause said cans to be washed interiorly and exteriorly as they are conveyed through said washing solution, a mechanism for automatically ejecting the washed cans from said members, a housing, a guide grate therein, means for receiving the discharged cans and delivering the same upon said guide grate, a reciprocating device in said housing for advancing the cans over said grate, means in said housing for rinsing said cans, and means in said housing for sterilizing the rinsed cans.

17. In a can washing machine, a casing containing a washing solution, mechanisms therein for conveying cans through said washing solution, a plurality of cleaning mechanisms in said casing for scrubbing the interior and exterior surfaces of the cans, a housing, a cradle mechanism thereon, an ejecting device for automatically discharging washed cans from said casing, movable means for receiving the discharged cans and delivering the same to said cradle mechanism, a grate in said housing, means for actuating the cradle mechanism for delivering the washed cans in inverted position on said grate, feed means in said housing for advancing the cans over said grate, means in said housing for rinsing the cans, and a mechanism for sterilizing the rinsed cans.

18. A can washing machine comprising a casing containing a washing solution, mechanisms within the casing for alternately scrubbing the interior and exterior surfaces of cans, a housing adjacent the casing, a cradle mechanism thereon, means for ejecting the scrubbed cans from said casing, reciprocating means for receiving the discharged cans and delivering the same to said cradle mechanism, driving means for actuating the cradle mechanism to cause the same to deliver the scrubbed cans into said housing, a lower guide grate in said housing for supporting the cans, an upper guide grate in said housing for receiving the can covers, an upper feed device in said housing for advancing the can covers through the housing over the upper grate, a lower feed device in said housing for advancing the cans through the housing over the lower grate, means connecting both the upper and the lower feed devices with the driving means, means in said housing for washing the can covers, mechanisms in said housing for rinsing the cans and the can covers as they are advanced through the housing, and means in said housing for sterilizing the rinsed cans and covers before they are discharged from the housing.

19. In a can washing machine the combination with a casing containing a washing solution, rotary brush means for supporting and conveying cans through said solution, and a plurality of pivoted friction and brush mechanisms in the casing for alternately engaging the cans for causing scrubbing of the interior of the cans by said brush means and scrubbing of the exterior of the cans by said brush mechanisms.

20. In a can washing machine the combination with mechanisms for automatically washing the interior and exterior of cans, of a conveyor device, a plurality of pivoted receiving means for transferring the washed cans to said conveyor device, and means for rinsing and sterilizing the cans as they are moved along by the conveyor device.

21. In a can washing machine the combination with means for carrying cans through a washing solution, of mechanisms for automatically scrubbing the interior and exterior surfaces of the cans, a support, mechanisms for automatically transferring the washed cans to said support, reciprocating means projecting through said support to intermittently advance the cans, means for rinsing the cans as they are advanced over said support, and means for subjecting the rinsed cans to steam to sterilize the cans.

22. In a can washing machine the combination with a can washing mechanism, of a can rinsing mechanism, a pivoted cradle for delivering cans to the rinsing mechanisms, a pivoted tray for receiving cans from the washing mechanism and delivering the cans to said cradle, and means for operating the tray and cradle at predetermined times.

23. In a can washing machine the combination with a can washing mechanism, of can rinsing and sterilizing mechanisms, a conveyor for carrying cans through the rinsing and sterilizing mechanisms, a cradle mechanism for delivering washed cans to said conveyor, and a tray mechanism for receiving the washed cans from the washing mechanism and transferring the cans to said cradle mechanism for delivery to said conveyor.

24. In a can washing machine the combination with a can washing mechanism, of can rinsing and sterilizing mechanisms, a can conveyor device over said rinsing and sterilizing mechanisms, and a plurality of successively acting can receiving means for transferring washed cans from the washing mechanism to said conveyor device to permit the washed cans to be rinsed and sterilized while carried along by the conveyor device.

25. In a can washing machine the combination with mechanisms for washing cans and can covers, rinsing mechanisms, sterilizing mechanisms, a can moving mechanism, means for automatically ejecting the washed cans, a plurality of successively acting pivoted can receiving mechanisms adapted to receive the washed cans and automatically transfer the same to said can moving mechanism, a can cover moving mechanism and means for simultaneously actuating said can moving mechanism and said can cover moving mechanism to cause the same to advance the cans and covers through the rinsing mechanisms and then through the sterilizing mechanisms.

26. A can washing machine comprising a casing containing a washing solution, rotatable can carrying cleaning means for carrying a can through the washing solution, means in the casing for engaging the can to permit the cleaning means to scrub the interior of the can, means in the casing for scrubbing the exterior of the can, an ejecting device for discharging the cleaned can off of the cleaning means and from the casing, and pivotally mounted means for receiving the discharged can.

27. In a can washing machine the combination with mechanisms for washing a can, can receiving means, an ejecting device for automatically discharging the cleaned can, a swinging device for receiving the discharged can, and rack operated means for actuating the swinging device to cause delivery of the can to said receiving means.

28. In a can washing machine the combination with mechanisms for washing a can, a pivoted cradle, means for discharging the washed can, a can transferring device for receiving the discharged can and delivering the same to said cradle, a grate, operating means for elevating the cradle to cause the can to be deposited on said grate, a rinsing device and a sterilizing device below said grate, and a reciprocating device actuable by said operating means for intermittently advancing the can over the grate to be rinsed by the rinsing device and then sterilized by the sterilizing device.

29. In a can washing machine the combination with a casing, means therein for washing a can, means in the casing for automatically discharging the can at a predetermined time, a housing adjacent said casing, can rinsing means and can sterilizing means in said housing, a can receiver adapted to move at a predetermined time into a position to receive the discharged can, mechanisms for moving the can receiver into a position to permit the can to roll therefrom, and means for receiving the can and automatically transferring the same into said housing to be rinsed and then sterilized.

30. In a can washing machine the combination with a casing, means therein for washing a can, a housing adjacent the casing, rinsing and sterilizing mechanisms in said housing, a support in said housing, a can advancing mechanism in said housing, a cradle mechanism supported on the housing, a can discharge device in said casing for ejecting a washed can from the casing, a transfer device for receiving the ejected can and delivering the same to the cradle mechanism, said cradle mechanism adapted when actuated to deliver the can on said support, driving means for operating the can cleaning means in the casing, and a plurality of rack and pinion mechanisms connected to be operated by the driving means to cause operation of the can discharge device, the can transfer device, the cradle mechanism, and the can advancing mechanism, said advancing mechanism adapted to move the can on said support through the housing to be rinsed and then sterilized by the rinsing and sterilizing mechanisms.

31. A can washing machine comprising a casing containing a washing solution, can carrying and washing mechanisms in said casing, rotatable means in said casing supporting the can carrying and washing mechanisms, a driving device, gear members operated thereby for causing rotation of said can carrying and washing mechanisms, a pawl and ratchet mechanism connected with said rotatable means, an eccentric device for actuating the pawl and ratchet mechanism to cause rotation of the rotatable means, and gear members driven from said driving device for operating the eccentric device.

32. A can washing machine comprising a casing, a shaft projecting into the casing, means for driving the shaft, a sleeve rotatable on said shaft and projecting into the casing, a housing fixed on the inner end of said sleeve, a large gear fixed on said shaft within said housing, a plurality of shafts journalled on said housing and projecting therein, brushes fixed on the outer ends of said shafts, gears fixed on the inner ends of said shafts within the housing meshing with said large gear, an eccentrically controlled mechanism for connecting said sleeve with the driving means to cause rotation of the housing, and manually operated means for controlling the operation of said eccentrically controlled mechanism.

33. In a can washing machine the combination with a casing, a shaft projecting into the casing, means for driving the shaft, a sleeve rotatable on said shaft and projecting into the casing, a housing in said casing secured to said sleeve, a large gear in said housing fixed on said shaft to be rotated therewith, a plurality of shafts in said casing journalled in said housing, gears in said housing fixed on said shafts and meshing with said large gear to be rotated thereby, can carrying brushes in said casing mounted on said shafts to rotate therewith, a ratchet wheel fixed on the outer end of said sleeve, a member rotatable on the hub of said ratchet wheel, a pawl pivotally supported on said member, an eccentric mechanism connected with said member to actuate the same to cause the pawl to rotate said ratchet wheel and said housing, and means connecting the eccentric mechanism with said driving means to be driven thereby.

34. In a can washing machine, a casing, a rotatable housing therein, a sleeve thereon projecting from said casing, brushes supported on said housing, gears in said housing for rotating said brushes, a shaft in said sleeve and housing for operating the gears, a driving means for rotating the shaft, a toothed wheel fixed on the projecting end of said sleeve, a pawl mechanism coacting with the toothed wheel, an eccentric mechanism connected with the driving means for operating said pawl mechanism to cause rotation of the toothed wheel and said housing, and means disposed between the toothed wheel and said pawl mechanism for controlling the operation of said toothed wheel by said pawl mechanism.

35. In an article washing machine, a casing, a rotatable housing therein, a sleeve thereon projecting from said casing, brushes rotatably supported on said housing, means in said housing for rotating said brushes, a shaft in said sleeve and housing for operating said means, a driving means for rotating the shaft, a toothed wheel fixed on the projecting portion of said sleeve, a pawl mechanism coacting with said toothed wheel, an eccentric mechanism operated by the driving means to cause the pawl mechanism to rotate the toothed wheel and said housing, a pivoted member movably disposed between the toothed wheel and said pawl mechanism, a stop for holding the toothed wheel against reverse rotation, and a control device for moving the pivoted member into position to prevent rotation of the toothed wheel by said pawl mechanism.

36. In an article washing machine, a casing, cleaning mechanisms therein, a rotatable carrying device in said casing for supporting the cleaning mechanisms, a driving mechanism, means in said carrying device driven by the driving mechanism for operating the cleaning mechanisms when said carrying device is stationary and when the same is rotating, an eccentrically operated pawl and ratchet mechanism connected to be driven by said driving mechanism for rotating the carrying device, and manually operable control means adapted to be positioned to hold the carrying device against rotation.

37. In a washing machine, a casing, cleaning mechanisms therein, a rotatable carrying device in said casing for supporting the cleaning mechanisms, a driving mechanism, means in said carrying device driven by the driving mechanism for operating the cleaning mechanisms, a pawl and ratchet mechanism for rotating the carrying device, an eccentric mechanism driven by the driving mechanism and connected to operate the pawl and ratchet mechanism, a pivoted member associated with the pawl and ratchet mechanism, and lever operated means for moving the pivoted member into position to prevent functioning of the pawl and ratchet mechanism.

38. In a can washing machine, a casing, cleaning mechanisms therein, a rotatable carrying device in said casing for rotatably supporting the cleaning mechanisms, a driving mechanism, means in said carrying device driven by the driving mechanism for rotating the cleaning mechanisms, a ratchet wheel mechanism driven by the driving mechanism for rotating the carrying device, a bell crank control device normally positioned with respect to said ratchet wheel mechanism to prevent rotation of the carrying device, and a manually operated lever mechanism co-acting with the ratchet wheel mechanism and moving the control device into a position to permit the carrying device to be operated.

39. In a can washing machine, a casing, a can carrying device therein, a can ejecting mechanism in said casing, a driving mechanism, a pivoted bell crank, an eccentric device driven by the driving mechanism and connected to actuate the bell-crank, and rack and pinion mechanisms operated by the bellcrank and connected to the ejecting mechanism to actuate the same to cause a can to be discharged from the can carrying device.

40. In a can washing machine, a casing, a can carrying and cleaning device therein, a driving means for operating the same, a slidable member projecting into the casing, a spring controlled plate pivotally supported on the inner end of said slidable member, a hooked mechanism formed at one end of said plate, and mechanisms driven by the driving means for actuating the slidable member to cause the hooked mechanism on said plate to slide a can off of the carrying and cleaning device.

41. In a can washing machine, a casing, a can carrying device therein, a driving means for operating the same, a slidable rack projecting into the casing, a spring controlled ejector device pivotally supported on the inner end of said rack, and rack and pinion mechanisms operated by said driving means to actuate the rack to cause the ejector device to discharge a can from the carrying device.

42. In a can washing machine, a casing, a can carrying device therein, a driving means for operating the same, an ejector mechanism also operated by the driving means for discharging a can from said carrying device, a can receiver, a lever pivotally mounted on the exterior of the casing, a tray thereon adapted to be positioned to receive the discharged can, and rack and pinion mechanisms operated by the driving means for swinging said lever to cause the can in said tray to be delivered to the can receiver.

43. In a can washing machine, a casing, can washing mechanisms therein, a driving mechanism for operating the same, means for discharging a can from the casing when washed, a housing adjacent said casing, a support therein, a bent arm pivotally supported in the housing and projecting therefrom, a can receiving cradle pivotally supported on said bent arm for receiving the discharged can, a rack, an upright member fixed thereon, links connecting said upright member with the bent arm, and rack and pinion mechanisms driven by said driving mechanism for actuating the rack to cause the bent arm to elevate the cradle to permit the same to tip and deliver the can upon said support.

44. In a can washing machine, a casing, washing mechanisms therein, a driving mechanism for operating the same, means for discharging a can when washed from said casing, a housing, a support therein, an arm pivotally supported in the housing and projecting therefrom, a can receiving cradle pivotally supported on said arm for receiving the discharged can, a slidable member operated by the driving mechanism, an upright fixed thereon, links connecting said upright with said arm to cause the same to elevate the cradle to permit the cradle to tip and deliver the can upon said support, a bracket fixed on said upright and projecting through a slot in said housing, a slidable feed frame in said housing connected to the bracket to be actuated therewith, and tripping members on said slidable feed frame projecting through said support for engaging and feeding the can through the housing over said support.

45. In a can and can cover washing machine, a housing, mechanisms for washing and delivering cans into said housing, rinsing and sterilizing mechanisms in said housing, a can support in said housing, a can cover support in said housing adapted to receive can covers, a can cover washing mechanism in said housing, a can cover feed mechanism and a can feed mechanism in said housing, and means for simultaneously actuating the can cover feed mechanism and the can feed mechanism to alternately advance the cans and the can covers through the rinsing and sterilizing mechanisms.

46. A can and can cover washing machine comprising mechanisms for intermittently advancing cans and can covers through the machine, a fulcrumed arm connecting said mechanisms for advancing one of said mechanisms while the other is retracted, a rack device for actuating said arm, means for washing the cans and can covers as they are advanced, mechanisms for rinsing the washed cans and can covers, and mechanisms for sterilizing the rinsed cans and can covers as they continue to be advanced through the machine.

In testimony whereof I have hereunto subscribed my name.

HARRY C. McLEAN.